(12) United States Patent
Smith

(10) Patent No.: US 6,877,700 B2
(45) Date of Patent: Apr. 12, 2005

(54) HOSE SUPPORT APPARATUS WITH FOOTINGS

(75) Inventor: Dennis W. Smith, Anaheim, CA (US)

(73) Assignee: Evenfall Corporation, Anaheim, CA (US)

( * ) Notice: Subject to any disclaimer, the term of this patent is extended or adjusted under 35 U.S.C. 154(b) by 0 days.

(21) Appl. No.: 10/229,502

(22) Filed: Aug. 28, 2002

(65) Prior Publication Data

US 2004/0041060 A1 Mar. 4, 2004

(51) Int. Cl.$^7$ .................................................. F16L 3/00
(52) U.S. Cl. ............................ 248/49; 248/83; 138/106
(58) Field of Search ....................... 248/148, 150, 248/49, 80, 85, 75, 166; 138/106

(56) References Cited

U.S. PATENT DOCUMENTS

| | | | | |
|---|---|---|---|---|
| 412,199 A | * | 10/1889 | McIlhenny | 182/109 |
| 1,543,723 A | * | 6/1925 | Rivitz | 182/109 |
| 1,973,226 A | * | 9/1934 | Rose et al. | 182/109 |
| 3,021,102 A | * | 2/1962 | Kuempel | 248/49 |
| 3,169,741 A | * | 2/1965 | Bittner | 248/49 |
| 3,288,406 A | * | 11/1966 | Degen | 248/49 |
| 3,406,933 A | * | 10/1968 | Wait et al. | 248/80 |
| 3,572,622 A | * | 3/1971 | Smith | 248/49 |
| 3,730,228 A | * | 5/1973 | Gibbs, Sr. | 138/106 |
| 3,767,149 A | * | 10/1973 | Hill | 248/49 |
| 3,819,137 A | * | 6/1974 | Smith | 248/49 |
| 4,047,798 A | * | 9/1977 | Bennett | 359/553 |
| 4,080,770 A | * | 3/1978 | Vigh | 52/689 |
| 4,082,242 A |  | 4/1978 | Smith | |
| 4,169,571 A | * | 10/1979 | Duggan | 248/49 |
| 4,194,711 A | * | 3/1980 | Winton | 248/49 |
| 4,406,434 A | * | 9/1983 | Schneckloth | 248/83 |
| 4,722,500 A | * | 2/1988 | Bray | 248/49 |
| 4,756,641 A | * | 7/1988 | Hartzheim | 404/136 |
| 4,878,782 A | * | 11/1989 | Beattie et al. | 405/119 |
| 5,033,702 A | * | 7/1991 | Robbins | 248/83 |
| 5,788,193 A | * | 8/1998 | Hilbert | 248/80 |
| 5,954,156 A | * | 9/1999 | Cooke | 182/153 |
| D468,448 S | * | 1/2003 | Blehm | D25/68 |

* cited by examiner

*Primary Examiner*—Kimberly Wood
(74) *Attorney, Agent, or Firm*—Blakely, Sokoloff, Taylor & Zafman LLP

(57) ABSTRACT

Hose support with footings. A footing may add stability to a hose support that bears a hose that connects a vehicle to a sewer. The footing may include a cavity having dimensions sufficient to accommodate a bottom portion of a leg of a hose support arch. The footing is removably attached to the leg of the hose support arch and extends perpendicularly from the hose support to stabilize the hose support. The hose support may include a plurality of interconnected arches such that the hose support is extendable from a closed alignment to an open alignment. At least one footing is removably attached to a bottom portion of the legs of the interconnected arches to increase the lateral stability of the hose support.

13 Claims, 4 Drawing Sheets

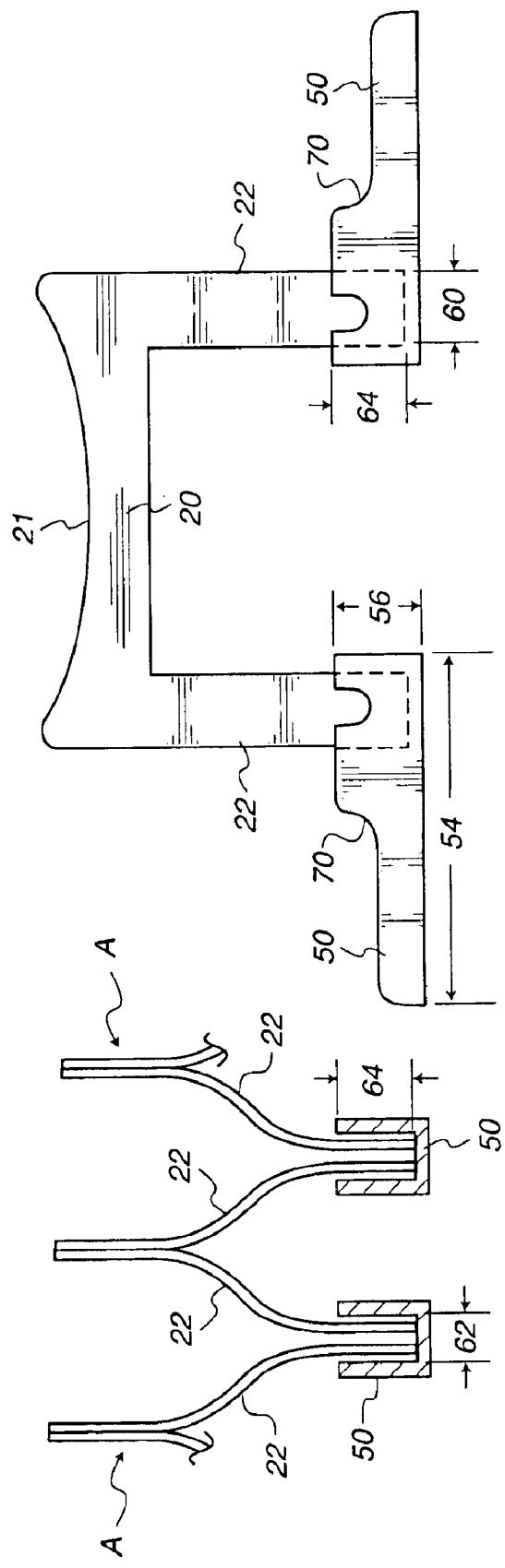

US 6,877,700 B2

HOSE SUPPORT APPARATUS WITH FOOTINGS

FIELD OF THE INVENTION

The invention relates to footings for a hose support and a hose support having removably attachable footings, the hose support to bear a hose that connects recreational vehicles to sewage drains for the disposal of waste.

BACKGROUND OF THE INVENTION

Connection to a sewer is a requirement for trailer homes, campers and motor homes, there being sanitation connections at both the vehicle and park facility for this purpose, and which involves the installation of a flexible hose to extend therebetween. Such hoses are light weight tubes adapted to be stored and to be extended for use, with clamps or the like to ensure fluid tightness at both the vehicle outlet and park drain pipe. In practice, those hoses are made of plastic reinforced by circumferential accordion folds or convolutions with or without helical wire bracing, and as such are extensible from, for example, 20 inches to 10 foot in length. It is significant that due to lightness in construction these hoses are very flexible, so that they deflect and sag when subjected to the weight of waste bearing liquids. To this end it is customary to support these sewer hoses with improvised props or with some racks designed for this purpose, and because of the requirement for drainage fall it is necessary to support the hose high at the inlet end and low at the outlet end; and consequently the usual rack for this purpose is cumbersome to say the least. Characteristically, the vehicle outlet connection is at the high elevation above the ground surface, while the park disposal drain inlet is at and/or slightly above the ground surface.

Due to the varying sizes of motor homes, trailer homes and campers, varying sized parking spaces are provided as a one size fits all solution so that when parked, these vehicles are typically at differing distances from drain connections. Further, the vehicle outlet connection and the park facility drain connection are never identically placed. Therefore, a great deal of latitude is required of the flexible sewer hose installation and the sewer hose ends can be bent or warped into any height alignment with the vehicle and park connections. The fall of a waste bearing hose is all important in order for it to drain properly.

One hose support meeting the above requirements is the subject of U.S. Pat. No. 4,082,242 issued to James B. Smith (the "Smith '242 patent"). The hose support described therein works well in many situations. However, when the ground or other terrain on which the support rests is uneven, this and other hose supports may fall over. Similarly, when land or other structures adjacent to the surface on which the hose support is placed is of a different height than the surface directly under the hose support, this and other hose supports may have a tendency to tip over. Significantly, the hose support described in the Smith '242 patent has a tendency to fall over when large quantities of liquid and solid waste are released into the flexible hose. That is, the rush of liquid and solid waste creates forces that cause the hose to flex and/or twist vertically and/or horizontally, tipping over the hose support described in the Smith '242 patent.

SUMMARY OF THE INVENTION

The present invention relates to footings for hose supports, and the support which receives such footings. Such footings add stability to a hose support that bears a hose that connects a vehicle to a sewer. The footings include a cavity having dimensions sufficient to accommodate a bottom portion of a leg of a hose support arch of a plurality of hose support arches. The footings are removably attached to the leg of the hose support arch and extend perpendicularly from the hose support to stabilize the hose support. The hose support bears a drain hose that connects a vehicle to a drain and includes a plurality of interconnected arches such that the hose support is extendable from a closed alignment to an open alignment. A plurality of footings is removably attached to a bottom portion of the legs of the interconnected arches to increase the lateral stability of the hose support.

BRIEF DESCRIPTION OF THE DRAWINGS

The invention will be understood from the following detailed description throughout which reference is made to the accompanying drawings, in which:

FIG. 5 is an enlarged elevation of an embodiment of a hose support arch taken substantially as indicated by line 4—4 on FIG. 1, the arch having support footings attached thereto.

FIG. 6 is plan view of an embodiment of a hose support taken substantially as indicated by line 3—3 on FIG. 1, the hose support having support footings attached thereto.

DETAILED DESCRIPTION

This invention involves an apparatus such as a footing to be removably attached to a structure that supports a hose that connects trailer homes, campers, motor homes and the like with facilities that provide sewage drains. These vehicles have internal sewage facilities for the disposal of waste via an external sewage hose connector. These vehicles patronize facilities where sewage drains are provided. When parked, the vehicle outlet connection is generally substantially higher than and a distance from the sewage drain connection. Because the parking area sewer connection is typically any where from a few feet to 25 feet or more from the location of the vehicle connection, a flexible hose is required for interconnection therebetween. Both horizontal and vertical alignments must be made while attaching a sloped hose from which waste will exit from the vehicle and proceed into the sewer connection. Otherwise spillage and backup may occur upon disconnection and/or during continued use, such as when pockets of fluid waste accumulate within the hose.

Figure 1:
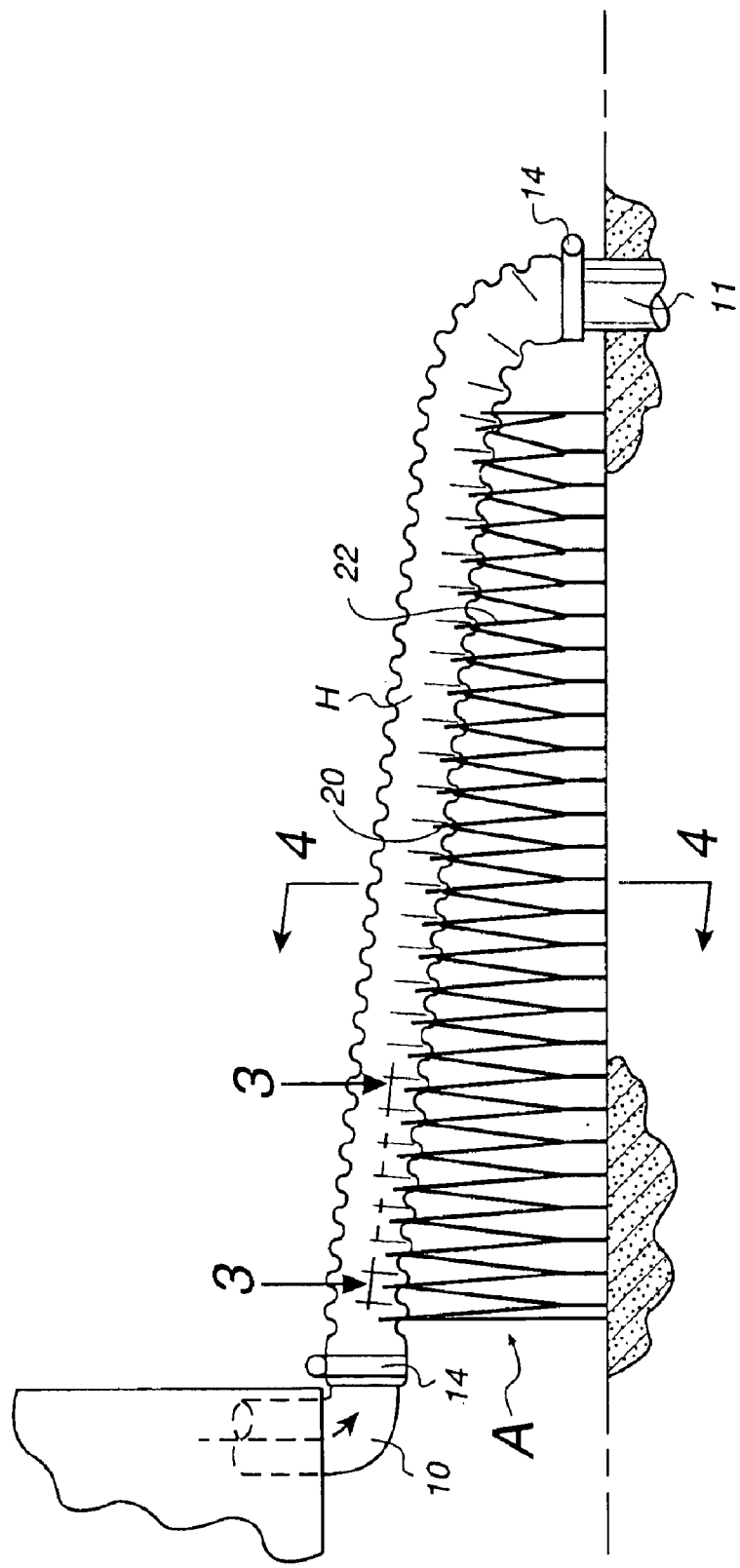
FIG. 1 is a side elevation of a prior art embodiment of a hose support in an extended working condition.

FIG. 1 is a side elevation of a prior art embodiment of a hose support in an extended working condition. The prior art hose support of U.S. Pat. No. 4,082,242 issued to James B. Smith describes a structure that bears the sewage hose from its connection to a vehicle to the sewage drain (the "Smith '242 patent"). As shown, there is a vehicle sewage outlet fitting 10 at the frame level of the vehicle, and there is a park facility inlet drain fitting 11 opening at or slightly above the ground or pavement level of the parking area. Arches A of the hose support are spaced both horizontally and vertically so that drainage occurs from the vehicle fitting 10 to the park fitting 11, by virtue of the fall or declination of a hose H disposed therebetween on the arches. A typical hose H is a thin walled plastic tube with circumferential corrugations which may be reinforced by a helical wire. A flexible hose of this description may be extended from a compressed condition 20 inches in length to a utilitarian condition up to 10 feet or more in length, and simultaneously bent or warped into any reasonable curvature required. The opposite ends of the hose H are coupled to the fittings 10 and 11 by means of hose clamps 14 or the like.

Figure 2:
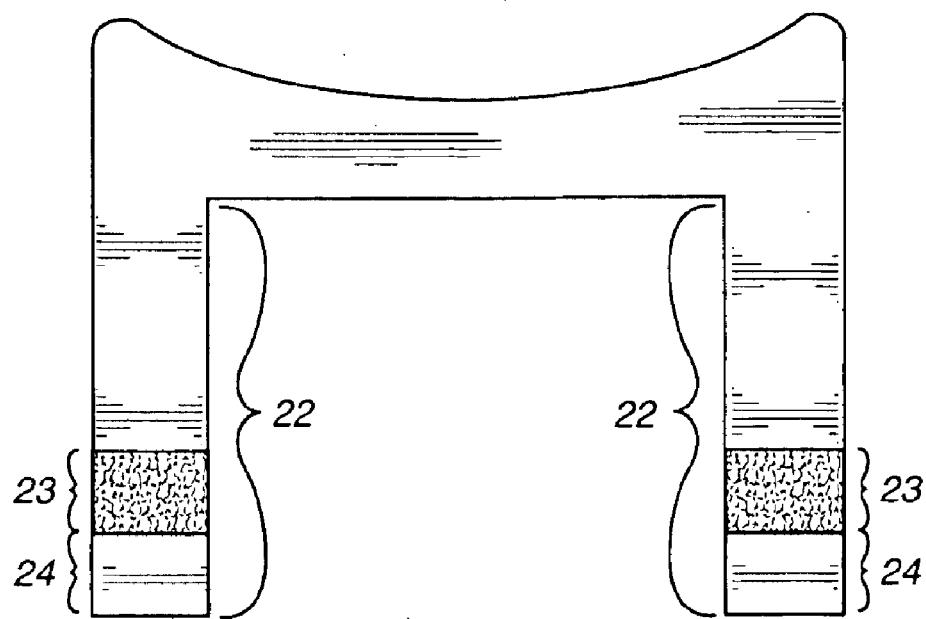
FIG. 2 is a an enlarged elevation of an embodiment of a hose support arch taken substantially as indicated by line 4—4 on FIG. 1.

FIG. 2 is a an enlarged elevation of an embodiment of a hose support arch taken substantially as indicated by line 4—4 on FIG. 1. The hose support depicted therein herein includes a multiplicity of like arches A that are interconnected in a series adapted to be adjacently stacked for storage and to be extended for erection and support of a hose or the like. A feature of the support is the planar character of the arches that are linked one to the other at alternately remote points of joinder, so as to be extensible from the collapsed condition. That is, the arches are formed so that the support yields under tension when extended and springs back to the collapsed position when released. Another feature of the support is that the arches A decline in height from one end of the support to the other. In addition, the height of the tallest arch of the hose support may be designed so as to be near the vehicle sewage outlet's lowest point. Various embodiments having tallest arches to accommodate different vehicles having varying ground clearance may be constructed.

The arches A are alike and vary only as to height. Each arch A is a planar member of relatively stiff material such as light weight plastic, for example polypropylene which has high impact qualities and is also flexible and resilient. The hose H may be three inches in diameter in which case the arch is considerably wider or of six inches or more width, with a transverse header 20 that is concaved to present a saddle 21 to center the hose. The concavity of the saddle 21 may be of slightly greater radius than the hose, so as to permit some lateral movement of the hose upon the supporting arch. A feature of the hose support is that each arch A has opposite depending legs 22 individually flexible relative to each other, there being a leg at each side of the arch and extending perpendicularly to a coplanar supporting plane. Each leg has coplanar bottom edges adapted for ground engagement. Although the legs of each successive arch are taller than the next adjacent arch in the direction of declination, the proportion of each of the legs of each of arches A are the same. Each arch A is a planar member with a horizontally disposed transverse header 20 having a pair of spaced depending legs 22 perpendicularly disposed at opposite sides of the header. In one embodiment, the header and legs have a cross section of 1/10 inch by 7/8 inch, nominally.

The arches of the hose support described herein are assembled in an adjacent relationship, one flat against the other, and permanently connected alternately at opposite legs 22, toward the ground engaging end portions of the legs. As shown in FIG. 2, each leg has a lower area 23, reserved for permanent joinder to the next adjacent arch leg. In one embodiment, lower area 23 may be approximately one to one and a half inches in height and may be from one to one and a half inches from the bottom of leg 22. That is, the leg 22 at one side of an arch A is secured at its area 23 to a preceding arch A, while its other leg lower area 23 is secured to a succeeding arch A. In this way, the alternate lower portions of the legs of the arches are alternately interconnected, and the remaining interfaces of the arches are free.

Figure 3:
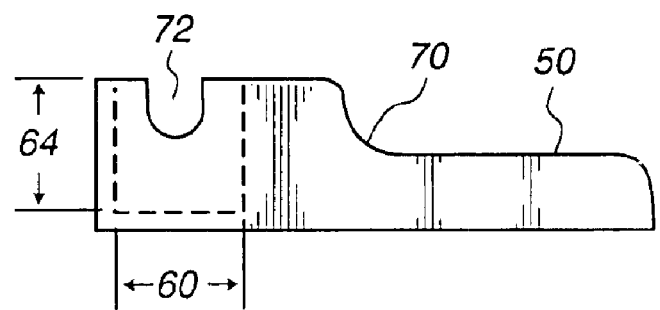
FIG. 3 is a side view of an embodiment of a support footing for a hose support.

Joinder and/or securement of the adjacently related arches is accomplished by using a staple, rivet or other fastening means to secure lower areas 23 of alternately opposite side legs 22. In another embodiment, the securing may be achieved by an adhesive or solvent, or by heat welding, restricted to lower areas 23. By linking the lower areas 23 of the alternately opposite side legs 22, the interconnected series or arches spring open in zigzag form as viewed in both elevation and plan, as shown in FIGS. 1 and 3. The arches A spring back into compact adjacency when released.

The prior art hose support described herein and other hose supports provide a simple and practical combination of arches that is compact for storage and is extensible for use. The sewer hose H rests in the multiplicity of saddles 21 that enter between the hose corrugations formed by the reinforcement convolutions of the hose. Resiliency and flexibility is inherent in the support formed of the interconnected arches A that are bent or warped one from the other as circumstances require. Legs 22 project to decreasing height as the support extends from the vehicle outlet waste fitting 10 to the park facility drain fitting 11, while bending or warping laterally as well as to align therewith, as shown in FIG. 1.

Although the prior art hose support described above works well in many situations, the prior art hose support and other hose supports may require additional stability to maintain upright so as not to fall over when the ground or terrain on which the hose support rests is uneven and to withstand the forces generated when liquid and solid waste are introduced into the hose in a large quantity, such as 100 gallons, over a short period of time or instantaneously. To provide additional support to hose supports, a removably attachable support footing or shoe may be attached to the legs of arches that comprise the hose support.

Figure 4:
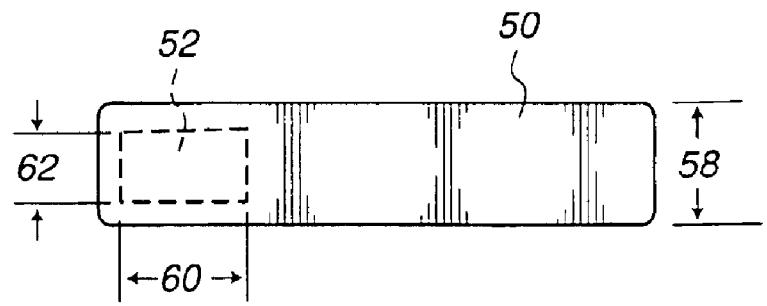
FIG. 4 is a top view of an embodiment of a support footing for a hose support.

FIG. 3 is a side view of an embodiment of a support footing for a hose support, and FIG. 4 is a top view of an embodiment of a support footing for a hose support. Support footing 50 include receiving cavity 52 into which one or two legs of an arch of a hose support may be inserted. In one embodiment, support footing 50 replicates the shape of a shoe that is worn on a human foot, as shown in FIG. 3. As such, a sloping region 70 separates the receiving cavity area at a proximal end of the support footing from the distal end of the support footing. However, such shape can be modified without departing from the scope of the present invention (e.g., a rectangle or block). In one embodiment, support footing 50 may include a groove or notched area 72 which serves the purpose of facilitating the attachment of the support footings to arches which are interconnected with a staple or other attaching means that may impede on the bottom portion 24 of arch A. Notched area 72 allows for insertion of arch legs into the support fitting without interference from a staple or other attaching means which is used to interconnect neighboring arches.

FIG. 5 is plan view of an embodiment of a hose support taken substantially as indicated by line 3—3 on FIG. 1, the hose support having support footings attached thereto, and FIG. 6 is an enlarged elevation of an embodiment of a hose support arch taken substantially as indicated by line 4—4 on FIG. 1, the arch having support footings attached thereto. In one embodiment, the support footing may be constructed to be used with a hose support constructed as described in the Smith '242 patent discussed above. In this embodiment, removably attachable support footing 50 may be attached to bottom portions 24 of pairs of connected legs 22 of arches A. Support footing 50 may include receiving cavity 52 which is used to receive the bottom portions 24 of a pair of connected legs 22. That is, a pair of permanently attached legs 22 may be slid into support footing 50. The dimensions of receiving cavity 52 must be of sufficient size so that support footing 50 may be easily attached to a pair of legs 22 of two adjacent arches, but may also be easily removable.

It is preferable that the support footing be removably attachable so that in those situations in which the hose and the hose support must traverse a narrow area, the support footings may be removed so that the hose support may fit in the narrow area. So that the support footing may be easily attachable and easily removable, the receiving cavity is of a size sufficient to snugly receive the legs of one or more arches of a hose support. Referring again to an embodiment of the hose support footing that is compatible with a hose support described in the Smith '242 patent, receiving cavity 52 has a cavity length 60 which is approximately the width of legs 22, and the receiving cavity width 62 is of a size that approximates the depth of two of legs 22 of arch A. More specifically, in one embodiment, the receiving cavity 52 of support footing 50 may have a cavity length 60 of ⅞ inch, a cavity width 62 of ¼ inch, and a cavity height 64 of ⅝ inch. The external dimensions of support footing 50 must be of a sufficient size so as to provide the additional stability required for the hose support. In one embodiment, support footing length 54 is approximately 2½ inches, support footing height 56 is approximately ¾ inch, and support footing width 58 is approximately ¾ inch. The sizes of the support footing/receiving cavity described herein are only set forth as examples, and similarly scaled support footings may be used to provide additional stability to various other sized arches of similarly constructed hose supports.

The most common use of the hose support footings is to attach the support footings to all hose support arches when the terrain between a vehicle and a sewage drain is uneven. In an embodiment of the support footings for use with a hose support made according to the Smith '242 patent, the support footings include a cavity of sufficient dimensions so that the footings are removably attachable to the permanently attached pairs of legs of the hose support arches. In some situations, it may be preferable to use a support footing only on one side of each of the arches comprising the hose support, so that stability is provided on an uneven surface to prevent the hose support from falling over. In some situations, the removably attachable support footings may be attached to only one side of a first group of adjacent arches of the hose support and the other side of a second group of adjacent arches of the hose support when the underlying surface is sloped in one direction under the first group and sloped in an opposite direction under the second group.

Figure 7:
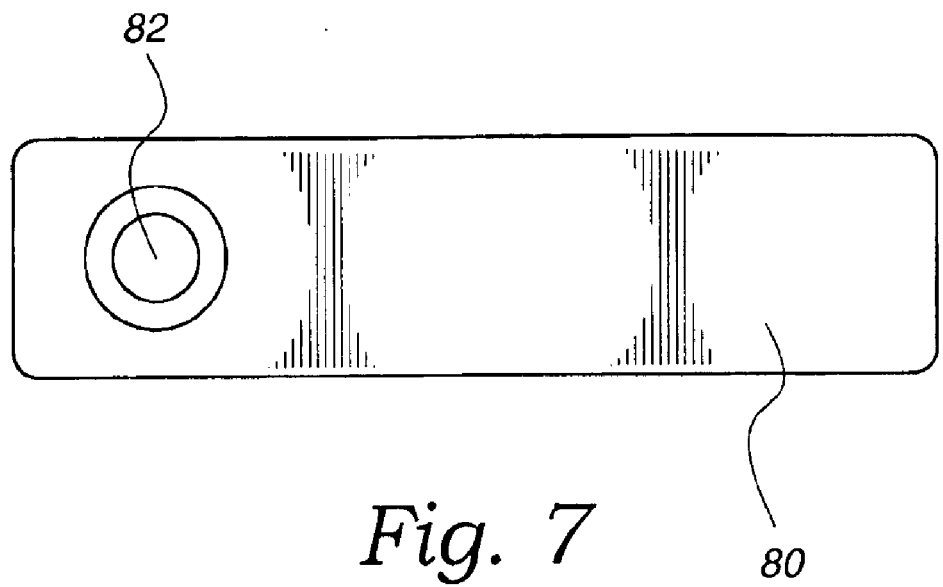
FIG. 7 is a top view of an embodiment of a support footing for a hose support.
Figure 8:
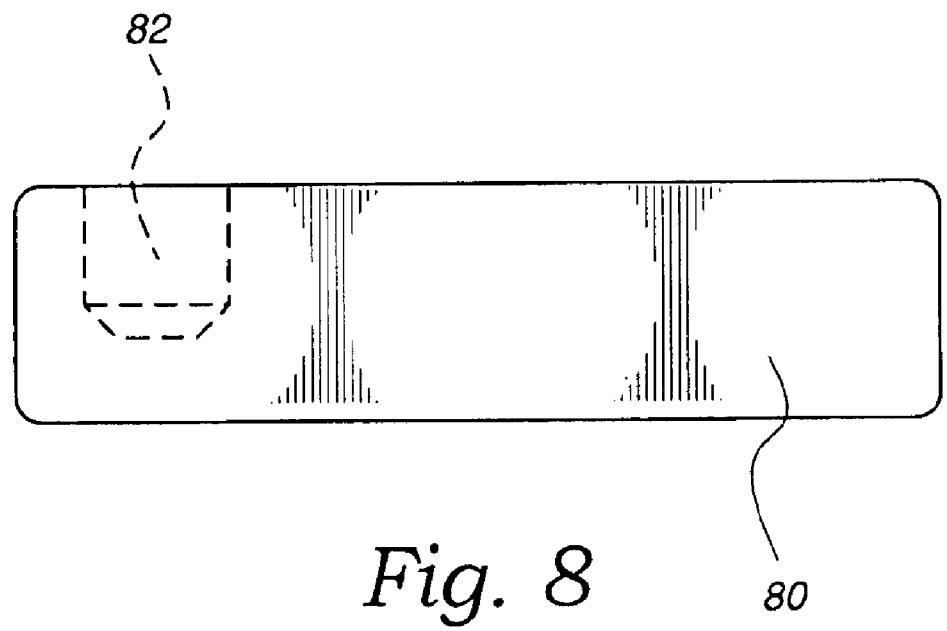
FIG. 8 is a side view of an embodiment of a support footing for a hose support.

FIG. 7 is a top view of an embodiment of a support footing for a hose support, and FIG. 8 is a side view of an embodiment of a support footing for a hose support. Some hose supports may be constructed of multiple arches which have legs that are cylindrical such that the legs have a circular or oval cross section. In these embodiments, the support shoe or support footing 80 may have a circular or oval shaped receiving cavity 82. Depending on the construction and design of various hose supports, receiving cavity 82 should be of a size to accommodate one or two legs of adjacent arches that make up the hose support.

In one embodiment, the support footings may include in the receiving cavity one or more o-rings or a liner made of rubber or plastic which allows the support footing to be more readily removable, while concurrently increasing the strength of the attachment of the arch leg or legs to the support footing.

In the foregoing specification, the invention has been described with reference to specific embodiments. It will, however, be evident that various modifications and changes can be made without departing from the broader spirit and scope of the invention as set forth in the appended claims. The specification and drawings are, accordingly, to be regarded in an illustrative rather than a restrictive sense.

What is claimed is:

1. A hose support to bear a dram hose that connects a vehicle to a drain, the hose support comprising:

a plurality of arches having legs, said arches connected to one another at their legs such that the hose support is extendable from a closed alignment to an open alignment, the arches connected in successively decreasing height from a vehicle end arch to a drain end arch; and a plurality of footings, each footing has a cavity to snugly receive a bottom portion of one or more legs of a pair of said connected arches, wherein the one or more legs and the cavity are sized such that the one or more legs can be slid into the footing so that the footing can be easily attached to and easily removed from the legs, and each footing has an external length dimension, in a lateral direction of the hose support, that is sufficient to provide additional lateral stability for the hose support to remain upright when waste material is introduced into the hose.

2. The hose support of claim 1, wherein at least one footing extends generally perpendicular to the arches of the hose support.

3. A drain hose support to bear a drain hose that connects a vehicle to a sewer connection, the support having a vehicle connection end and a sewer connection end, the support including:

a series of like vertically disposed and adjacently related arches of flexible material, each arch having (a) coplanar bottom edges adapted for ground engagement, (b) a hose supporting header at a fixed height successively decreasing from the vehicle connection end to the sewer connection end, and (c) two side legs depending from the hose supporting header;

interconnecting means at alternately opposite side legs of all intermediate arches, the interconnecting means joining the series of arches for flexible separation from adjacent arches, the endmost arches having one free side leg;

the arches to longitudinally extend in a linked relation to supportably engage the drain hose such that the support is disposed to decline in elevation from the vehicle to a sewer connection; and at least one footing removably attached to at least one side leg to increase the stability of the support each footing has a cavity to snugly receive a bottom portion of a pair of alternately opposite side legs, wherein said alternately opposite side legs and the cavity are sized such that the legs can be slid into the footing so that the footing can be easily attached to and easily removed from the legs, and each footing has an external length dimension, in a lateral direction of the hose support, that is sufficient to provide additional lateral stability for the hose support to remain upright when waste material is introduced into the hose.

4. The drain hose support as set forth in claim 3, wherein the like arches are flat members of planar material.

5. The drain hose support as set forth in claim 3, wherein the alternately opposite side legs of the arches are joined at their lowermost end portions only.

6. The drain hose support as set forth in claim 3, wherein the like arches are flat members of planar material and the alternately opposite side legs thereof joined at their lowermost end portions only.

7. The drain hose support as set forth in claim 3, wherein the headers are transversely concave to engage the drain hose.

8. The drain hose support as set forth in claim 3 wherein the headers are transversely disposed to engage the drain hose between axially spaced circumferential convolutions of the drain hose so that the drain hose and the arches may be positioned with respect to each other.

9. The drain hose support as set forth in claim 3, wherein the arches are transversely disposed members of planar material and the headers have concave upper edges to engage between axially spaced circumferential convolutions of the drain hose so that the drain hose and the arches may be positioned with respect to each other.

10. The drain hose support as set forth in claim 3, wherein the footings extend in a first plane that is generally perpendicular to a second plane of the hose support.

11. A hose support to bear a drain hose that connects a vehicle to a drain, the hose support comprising:

a plurality of arches, each arch having two legs;

each arch being connected to its neighbor arch at a lower area of one of the legs of the arch forming alternating pairs of connected legs among the arches such that the hose support is extendable from a closed alignment to an open alignment;

the arches connected in successively decreasing height from a vehicle end arch to a drain end arch, intermediate arches thereinbetween, the vehicle end arch being the tallest arch having a height sufficient to support a drain hose connection to the vehicle; and a plurality of footings attached to a bottom portion of the connected legs to increase the lateral stability of the hose support each footing has a cavity to snugly receive a bottom portion of a pair of said connected legs, wherein the legs and the cavity are sized such that the legs can be slid into the footing so that the footing can be easily attached to and easily removed from the legs, and each footing has an external length dimension, in a lateral direction of the hose support, that is sufficient to provide additional lateral stability for the hose support to remain upright when waste material is introduced into the hose.

12. The drain hose support of claim 11, wherein the footings extend generally perpendicular to the arches of the hose support.

13. The hose support of claim 3 further comprising:

more than one footing attached to the bottom portion of more than one of said legs to increase stability of the hose support.

* * * * *